US 8,676,966 B2

(12) United States Patent
Podjarny et al.

(10) Patent No.: US 8,676,966 B2
(45) Date of Patent: Mar. 18, 2014

(54) DETECTING AND MONITORING SERVER SIDE STATES DURING WEB APPLICATION SCANNING

(75) Inventors: Guy Podjarny, Ottawa (CA); Adi Sharabani, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 12/647,983

(22) Filed: Dec. 28, 2009

(65) Prior Publication Data

US 2011/0161486 A1 Jun. 30, 2011

(51) Int. Cl.
G06F 15/16 (2006.01)
G06F 15/173 (2006.01)
H04L 29/08 (2006.01)

(52) U.S. Cl.
CPC .................. *H04L 29/08072* (2013.01)
USPC ........... 709/224; 709/217; 709/218; 709/219; 709/220; 709/221; 709/222; 709/223; 709/225; 717/120; 717/121; 717/122; 717/123; 717/124; 717/126; 717/127; 717/128; 717/131; 717/136; 717/137; 717/168; 717/171; 717/172

(58) Field of Classification Search
USPC .................. 709/217–228; 717/104, 106, 110, 717/120–124, 126–128, 131, 136–137, 717/140–142, 168, 171, 172
See application file for complete search history.

(56) References Cited

U.S. PATENT DOCUMENTS

| | | | |
|---|---|---|---|
| 5,815,653 A * | 9/1998 | You et al. .................... 714/38.13 |
| 6,571,285 B1 * | 5/2003 | Groath et al. ................ 709/223 |
| 6,609,128 B1 * | 8/2003 | Underwood ................... 707/610 |
| 6,718,535 B1 * | 4/2004 | Underwood ................... 717/101 |
| 6,721,941 B1 * | 4/2004 | Morshed et al. .............. 717/127 |
| 6,907,546 B1 * | 6/2005 | Haswell et al. ............. 714/38.11 |
| 6,970,914 B1 * | 11/2005 | Philyaw et al. ............... 709/217 |
| 6,985,901 B1 * | 1/2006 | Sachse et al. ......................... 1/1 |
| 6,990,438 B1 * | 1/2006 | Chowdhury et al. ........... 703/13 |
| 6,996,845 B1 | 2/2006 | Hurst et al. |

(Continued)

FOREIGN PATENT DOCUMENTS

WO WO-2006024021 3/2006

OTHER PUBLICATIONS

Darknet, Acunetix Web Vulnerability Scanner (WVS) 6.5 Released, http://www.darknetorg.uk/2009/06/acunetix-web-vulnerability-scanner-wvs-6-5-released, Jun. 19, 2009.

(Continued)

*Primary Examiner* — Saket K Daftuar
(74) *Attorney, Agent, or Firm* — Holland & Knight LLP; Brian J. Colandreo, Esq.; Jeffrey T. Placker, Esq.

(57) ABSTRACT

A computer-implemented method, system, and computer program product for detecting and monitoring server side state during the scanning of a web application. The method includes: monitoring executed code of the web application while scanning the web application; retrieving code coverage information from the monitoring of the executed code and retrieving scanning information from the scanning of the web application; correlating the code coverage information with the scanning information; and determining a change in the server side state based on the correlation. The system includes one or more devices that executes the steps of the method. The computer program products includes computer program instructions stored on a computer readable storage medium, where the instructions, when executed, will cause a computer to perform the steps of the methods.

19 Claims, 8 Drawing Sheets

(56) References Cited

U.S. PATENT DOCUMENTS

| | | | |
|---|---|---|---|
| 7,117,458 B1* | 10/2006 | Hurlock | 716/103 |
| 7,231,644 B2* | 6/2007 | Kieffer | 719/331 |
| 7,257,614 B2* | 8/2007 | Philyaw et al. | 709/202 |
| 7,292,970 B1* | 11/2007 | Hurlock | 703/23 |
| 7,383,333 B2* | 6/2008 | Philyaw et al. | 709/224 |
| 7,437,717 B1* | 10/2008 | Cowan et al. | 717/131 |
| 7,743,224 B2* | 6/2010 | Wang | 711/154 |
| 7,774,757 B1* | 8/2010 | Awasthi et al. | 717/127 |
| 7,805,510 B2* | 9/2010 | Bansal et al. | 709/224 |
| 7,861,226 B1* | 12/2010 | Episkopos et al. | 717/124 |
| 7,886,272 B1* | 2/2011 | Episkopos et al. | 717/124 |
| 7,945,898 B1* | 5/2011 | Episkopos et al. | 717/124 |
| 7,953,850 B2* | 5/2011 | Mani et al. | 709/224 |
| 2003/0033448 A1* | 2/2003 | Kieffer | 709/331 |
| 2003/0110266 A1 | 6/2003 | Rollins et al. | |
| 2004/0157620 A1* | 8/2004 | Nyu | 455/456.1 |
| 2004/0158746 A1 | 8/2004 | Hu et al. | |
| 2005/0080882 A1* | 4/2005 | Philyaw et al. | 709/220 |
| 2005/0138426 A1 | 6/2005 | Styslinger | |
| 2005/0144599 A1* | 6/2005 | Styles et al. | 717/140 |
| 2006/0095569 A1* | 5/2006 | O'Sullivan | 709/224 |
| 2006/0117055 A1 | 6/2006 | Doyle | |
| 2006/0259973 A1* | 11/2006 | Sima et al. | 726/25 |
| 2006/0282897 A1* | 12/2006 | Sima et al. | 726/25 |
| 2007/0083620 A1* | 4/2007 | Pedersen | 709/219 |
| 2007/0083655 A1* | 4/2007 | Pedersen | 709/226 |
| 2007/0083813 A1* | 4/2007 | Lui et al. | 715/709 |
| 2007/0094735 A1* | 4/2007 | Cohen et al. | 726/25 |
| 2007/0162708 A1* | 7/2007 | Wang | 711/154 |
| 2007/0266045 A1* | 11/2007 | Bansal et al. | 707/104.1 |
| 2007/0266148 A1* | 11/2007 | Ruiz et al. | 709/224 |
| 2007/0266149 A1* | 11/2007 | Cobb et al. | 709/224 |
| 2007/0300244 A1* | 12/2007 | Kieffer | 719/331 |
| 2008/0109790 A1* | 5/2008 | Farnham et al. | 717/128 |
| 2008/0209045 A1 | 8/2008 | Rothstein et al. | |
| 2009/0144698 A1* | 6/2009 | Fanning et al. | 717/120 |
| 2009/0187990 A1* | 7/2009 | Lalonde et al. | 726/23 |
| 2009/0287729 A1* | 11/2009 | Chen et al. | 707/102 |
| 2010/0057888 A1* | 3/2010 | Owen et al. | 709/219 |
| 2010/0064266 A1* | 3/2010 | Matsuda et al. | 716/4 |
| 2010/0070935 A1* | 3/2010 | Bist et al. | 716/4 |
| 2010/0070940 A1* | 3/2010 | Bist et al. | 716/5 |
| 2010/0088404 A1* | 4/2010 | Mani et al. | 709/224 |
| 2010/0095274 A1* | 4/2010 | Sadowsky | 717/124 |
| 2010/0318959 A1* | 12/2010 | Rowan et al. | 717/105 |

OTHER PUBLICATIONS

Li, An Automatic Execution System for Web Functional Test Base on Modelling User's Behaviour, Information Science and Engineering, 2008. ISISE '08., Dec. 20-22, 2008,pp. 263-267.

* cited by examiner

DETECTING AND MONITORING SERVER SIDE STATES DURING WEB APPLICATION SCANNING

BACKGROUND OF THE INVENTION

1. Field of the Invention

The present invention relates generally to web application scanning technology, and more particularly to systems and methods of detecting and monitoring server side states during the scanning of web applications.

2. Description of the Related Art

Web application security scanners, such as the IBM Rational AppScan, are tools that automatically spider or scan and test a web application in order to find vulnerabilities on it. These tools scan the site either automatically, by "clicking" on all the links, executing JavaScript, submitting forms, or manually, by following a user while browsing through the application. They then proceed to test the application by resending the user's requests with various modifications to trigger database (DB) exceptions and to uncover logic flaws and other vulnerabilities.

A significant challenge is maintaining a server-side state throughout the scan. The most widely faced example of such a server-side state is a login state. Web applications usually grant access to specific pages only while the user is logged in, and otherwise redirect the user to the login page or deny access if the user is not logged in. Staying logged in is a key factor for web application scanners. Without remaining logged in, the web application may assume that the scanner is invoking a page with malicious input, and be redirected to the wrong page.

For scanners, remaining logged in to the web application is not simple. A logout link may be accidentally triggered, the web application may detect an occurrence of suspicious activity during a session and invalidate the session, or there may be many other reasons that cause the scanning session to become logged out. Therefore, existing scanners have the capability to identify when a session is no longer valid, and in those cases the scanner will replay the login sequence, re-establish their session, and continue scanning.

There are two ways by which scanners identify whether it is still logged in to a site. First, a scanner will review the responses of all tests and regular requests to the site, to detect whether a pattern exists or is missing from the response that indicates it is logged out (such as a "Your session timed out, please re-login"). This technique is often inaccurate since different pages of the web application may respond in different (and not always predictable) ways when the session is logged out, sometimes simply returning an error, sometimes redirecting to another page, or sometimes giving a "no can do" message.

Second, a scanner will send a specific "heartbeat" request every few seconds (or X requests), and look for a pattern in its response. This technique takes away the unpredictability and the random manner by which each page responds when the scanner is logged out and the session ends. However, this technique of identifying whether a scanner is still logged in causes some performance overhead when the scanner determines that it is not logged in on time, needing to re-do the requests sent between the last successful heartbeat and the first failed one.

In addition, both techniques also require that the user configure the "Session Identifiers" that need to be refreshed. Since Hypertext Transfer Protocol (HTTP) is a stateless protocol, web applications save the session identifiers in cookies, HTTP parameters, the HTTP path, or other parts of the HTTP requests (e.g. the JSESSIONID cookie or parameter). When the scanner logs in again, it needs to know which parts of the HTTP requests to "track" and refresh on its next requests, so that the web application can consider the requests as part of the new session and not the old.

Both techniques also require user configuration, which is not always simple for users. While users may know how to login to the application, it is often complicated and time consuming for them to search for the session IDs or to configure the patterns to look for login state identification.

Although remaining logged in is the most common problem of the server-side state, modern web applications utilize server-side state on many other parts of the application. One example of such an application is an online flight reservation that requires users to select the departure and arrival city, then prompts users to select the fares and hours, and then for the choice of seating, etc. The application does not, however, allow users to change the order of selection. Another example is an online banking application that has a multi-step process for transferring funds, which requires multiple verification actions by the user. For these web applications, a scanner needs to recognize that every time it sends a request that is triggered later in the sequence (the later request), for example, request 5, the scanner must first send requests that are necessarily triggered before the later request, for example, requests 1-4.

These situations are currently only handled by requiring users to manually configure each sequence. These sequences often have HTTP variables that need tracking itself (such as the login sequence). For example, in a banking application, the process for transferring funds might involve creating a "transaction-id" parameter that needs to be tracked throughout the sequence. As such, sequences that modify server-side state require a lot of user time and attention.

SUMMARY OF THE INVENTION

In one embodiment of the present invention, a computer-implemented method is provided for detecting and monitoring server side state during the scanning of a web application, the method includes: monitoring executed code of the web application while scanning the web application; retrieving code coverage information from the monitoring of the executed code and retrieving scanning information from the scanning of the web application; correlating the code coverage information with the scanning information; and determining a change in the server side state based on the correlation.

The method may also include: monitoring executed code of the web application while scanning the web application; retrieving code coverage information from the monitoring of the executed code and retrieving scanning information from the scanning of the web application; and determining, based on the code coverage information and the scanning information, if a specified portion of the web application code was executed.

In still another embodiment of the present invention, a computer-implemented system is provided for detecting and monitoring server side state during the scanning of a web application including: a monitoring unit for monitoring executed code of the web application while scanning the web application; an information retrieving unit for retrieving code coverage information from the monitoring of the executed code and for retrieving scanning information from the scanning of the web application; a correlating unit for correlating the code coverage information with the scanning information; and a server side state analyzing unit for determining a change in the server side state based on the correlation.

In still another embodiment of the present invention, computer program products are provided for detecting and monitoring server side state during the scanning of a web application. The computer program products includes computer program instructions stored on a computer readable storage medium, where the instructions, when executed, will cause a computer to perform the steps of the methods.

BRIEF DESCRIPTION OF THE DRAWINGS

The block diagrams and flowcharts in the Figures illustrate the architecture, functionality, and operation of possible embodiments of methods, systems, and computer program products. In this regard, each block in the block diagrams or flowcharts may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DETAILED DESCRIPTION OF PREFERRED EMBODIMENTS

It will be readily understood that embodiments of the present invention, as generally described and illustrated in the figures herein, may be arranged and designed in a wide variety of different configurations in addition to the described preferred embodiments. Thus, the following detailed description of the embodiments of the present invention, as represented in the figures, is not intended to limit the scope of the invention, as claimed, but is merely representative of selected preferred embodiments of the invention. The following description is intended only by way of example, and illustrates certain selected preferred embodiments of the invention as claimed herein.

Information can be gathered by monitoring the executed code during runtime, while invoking specific actions through a web application scanner. The scanner interacts with the application, manually or automatically, through defined web protocols such as HTTP/S. By analyzing and monitoring this information, the embodiments of the present invention can: detect a change in server side state, extract information needed to track a server side state, and identify a server-side state.

By injecting task-specific and dedicated monitoring code (e.g. monitoring values of specific variables at certain points in the code, as opposed to the generic instrumentation of code-coverage), significant performance improvements can be achieved. For example, we can quickly and efficiently notice that a computer application is logged out by detecting a change in server side state. We can also extract the necessary HTTP session identifiers by extracting information needed to track the desired server side state. Further, we can identify a server-side state for non-login purposes, such as identifying when computer application is not in a valid state, by identifying the server-side state.

According to one embodiment of the present invention, a computer-implemented method of detecting and monitoring server side state during the scanning of a web application is provided.

Figure 1:
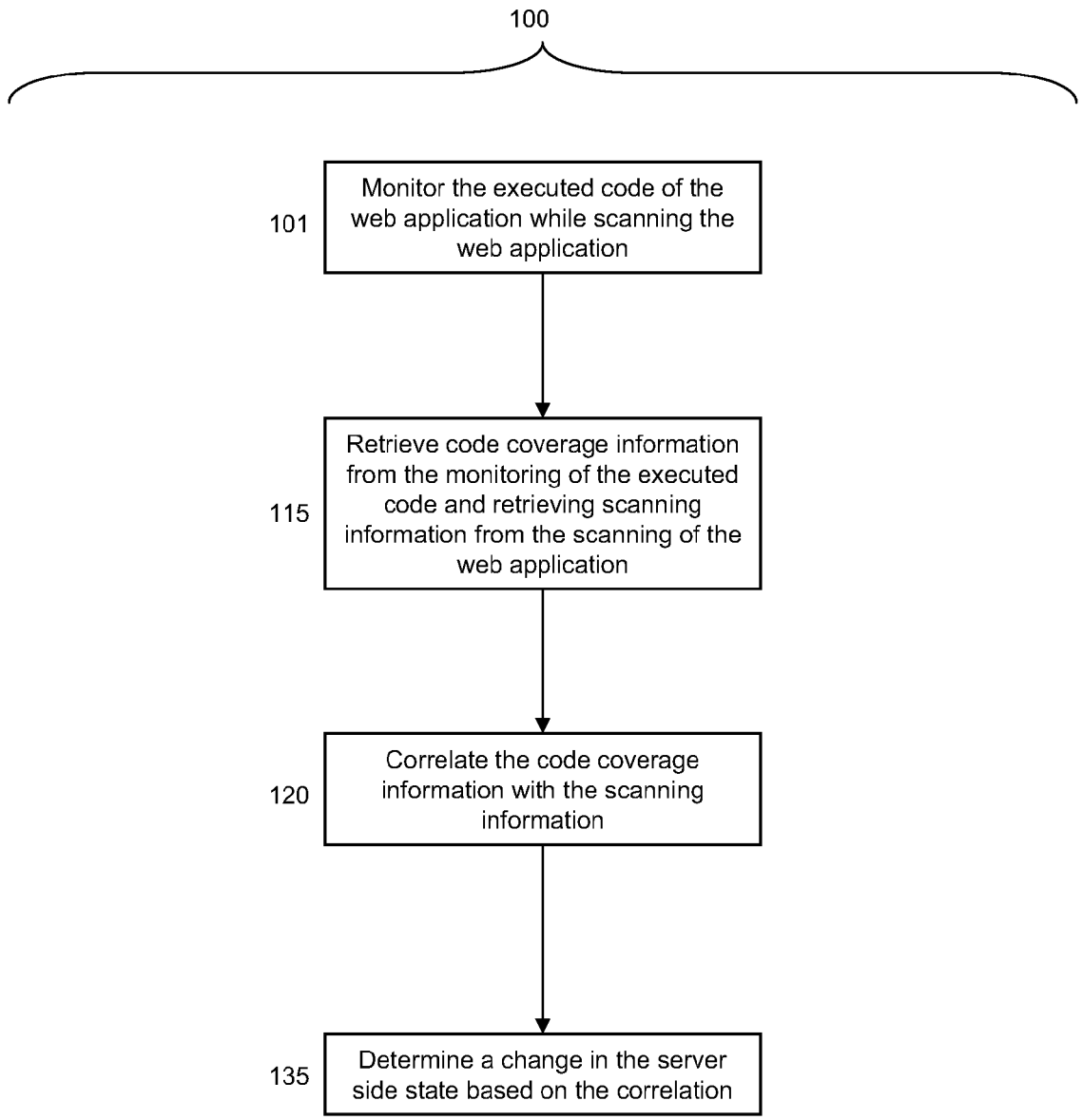
FIG. 1 is a flowchart that illustrates a computer-implemented method of detecting and monitoring server side state during the scanning of a web application according to embodiments of the present invention.

Referring to FIG. 1, a flowchart that illustrates a computer-implemented method of detecting and monitoring server side state during the scanning of a web application 100. According to one embodiment of the present invention, the method 100 monitors executed code of the web application while scanning the web application 101; retrieves code coverage information from the monitoring of the executed code and retrieves scanning information from the scanning of the web application 115; correlates the code coverage information with the scanning information 120; and determines a change in the server side state based on the correlation 135.

Figure 2:
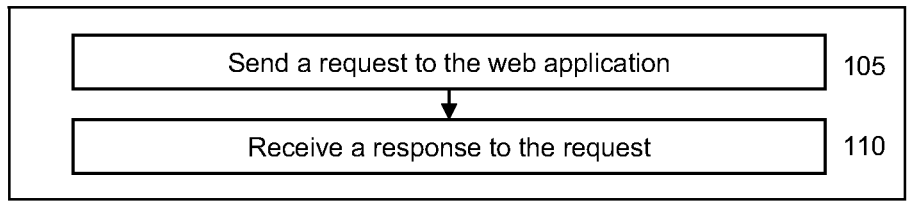
FIG. 2 is a flowchart that illustrates the details of the step of monitoring executed code of the web application while scanning the web application according to embodiments of the present invention.

FIG. 2 is a flowchart that illustrates the details of the step of monitoring executed code of the web application while scanning the web application 101. According to one embodiment of the present invention, monitoring executed code of the web application while scanning the web application 101 includes the steps of sending a request to the web application 105 and receiving a response to the request 110. The scanning and collection of code coverage is performed at the same time because the code is being collected as it is being executed by the scan.

Figure 3:
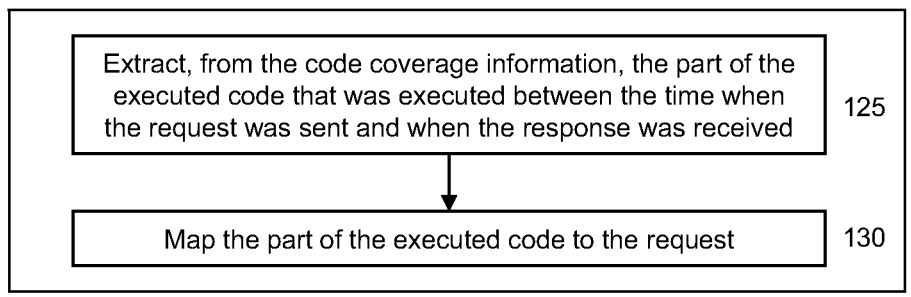
FIG. 3 is a flowchart that illustrates the details of the step of correlating the code coverage information with the scanning information according to embodiments of the present invention.

FIG. 3 is a flowchart that illustrates the details of the step of correlating the code coverage information with the scanning information 120. According to one embodiment of the present invention, correlating the code coverage information with the scanning information 120 includes the steps of: extracting, from the code coverage information, the part of the executed code that was executed between the time when the request was sent and when the response was received 125; and mapping the part of the executed code to the request to establish a relationship between the part of the executed code and the request.

When collecting code coverage, the collection can be turned on or off, and there are usually time stamps indicating which code was executed at what time. One way to map the executed code to the sent request would be to scan the application, turn the code coverage on just before sending the request, and turn it off after receiving the response. Alternatively, the timestamp can be used to indicate when the code was executed, which can be matched against when the request was sent. Embodiments of the present invention also allow for other ways of doing the same without sending one request at a time.

Figure 4:
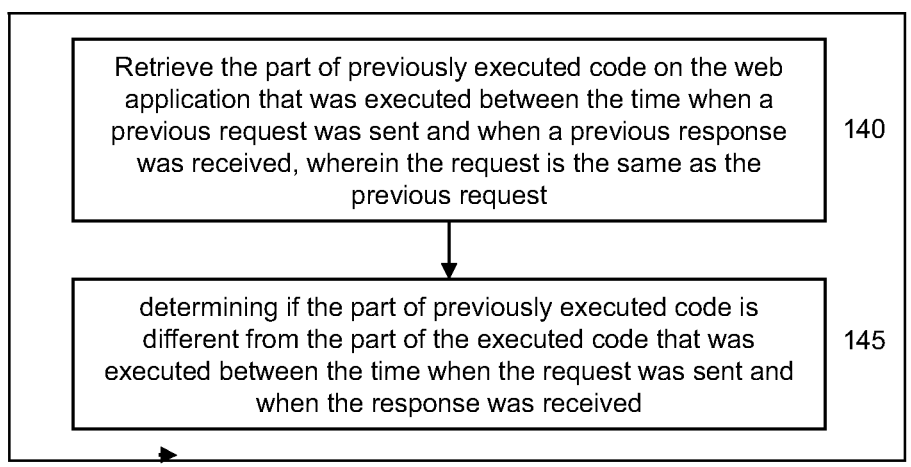
FIG. 4 is a flowchart that illustrates the details of the step of determining a change in the server side state based on the correlation according to embodiments of the present invention.

FIG. 4 is a flowchart that illustrates the details of the step of determining a change in the server side state based on the correlation 135. According to one embodiment of the present invention, determining a change in the server side state based on the correlation 135 includes the steps of: retrieving the part of previously executed code on the web application that was executed between the time when a previous request was sent and when a previous response was received, where the request is the same as the previous request 140; and determining if the part of previously executed code is different from the part of the executed code that was executed between the time when the request was sent and when the response was received 145.

The method according to this embodiment of the present invention can further include identifying the server side state based on the step of determining a change in the server side state (not shown in the figures.)

Alternatively, the computer-implemented method of detecting and monitoring server side state during the scanning of a web application according to embodiments of the present invention can also include: monitoring executed code of the web application while scanning the web application; retrieving code coverage information from the monitoring of the executed code and retrieving scanning information from the scanning of the web application; and determining, based on the code coverage information and the scanning information, if a specified portion of the web application code was executed (not shown in the figures.)

The specified portion of the web application code can be obtained by or can exist in many various forms that include but are not limited to the following: the specified portion of the web application can be obtained manually (e.g. by user a configuring which code gets executed); additionally, it can be obtained by heuristics—for example, knowing that if the web application runs on a specific application server, the function call "doLogOut" means we're logging out; yet another way of obtaining could be by auto-concluding which code implies a server side state (e.g., we're logged out) by comparing code execution of the same request in two user-induced states.

The steps of monitoring executed code of the web application while scanning the web application and retrieving code coverage information from the monitoring of the executed code and retrieving scanning information from the scanning of the web application can include similar sub-steps as mentioned above.

One possible implementation of the embodiment according to the present invention is as follows:

1. Define an "in-session validator", consisting of a condition to evaluate and one or more places in the code to evaluate it. If the validator results in failure, we can determine, for example, that we're logged out;

2. Inject the in-session validator evaluation using one of the following ways: (i) instrument the code to add a call to the in-session validator (either using run-time or compile-time instrumentation); (ii) use Aspect Oriented Programming; (iii) use conditional breakpoints (implies running it in a debugging environment);

3. Run a black-box scan;

4. In each case, if the in-session validator fails, notify the black-box engine scanning the application for it to act accordingly (likely stop, roll-back a bit, re-login and continue). Assuming the condition isn't overly complex, this flow can be very efficient and accurate, much more than sending heartbeat requests.

Another possible implementation of the embodiment according to the present invention is described as follows.

The in-session validator mentioned above can be configured automatically by comparing the code executed during login and during visiting a page while being and not being logged in. The black-box scanner should first auto-identify (using heuristics) or ask the user to record the login sequence and a page that's after the login page (common practice already in scanners).

Then, the following requests are sent: (a) send the login sequence (make sure we are logged in); (b) send the in-session request while using code coverage; (c) either logout from the application or start a new browsing session on the application without logging in; (d) send the in-session request while using code coverage (this time we are logged out). The first condition that differs the control flows of the requests (b) and (d) is the condition that actually validates the in-session.

We can drill down and find the exact condition being evaluated, and duplicate that condition as our in-session validator. Then, create a program slice for that condition to get actual commands that can be executed and allows this condition to be calculated. In some cases, we may want to repeat this process on various "logged in" pages in the application (in cases where we know we're not logged in), as sometimes different parts of the application check for session validity in different places or ways. This will be a simple (and automatic) repetition of this process with a few more pages.

Yet another possible implementation of the embodiment according to the present invention is by using heuristics on known platforms. Different platforms often use the same variables and conditions to check if a session is valid or is logged in, or to store session information on the server side, making the "What to ask for" part of the in-session validator pre-defined. We can look for the use of these variables and methods in the code (using the same static analysis techniques IDEs use to do refactoring), and auto-configure the "Where to ask" part.

Further, another possible implementation of the embodiment according to the present invention is using code-coverage to auto-identify pages that require any sort of state, beyond login. The implementation is described as follows:

1. Establish a valid session (by, for example, visiting the starting URL and logging into the application);

2. Scan the application in a "Depth First" mode (that is, simulating a user clicking links as the user sees them), collecting code-coverage for each page;

3. Every time we reach a leaf in the Depth First browse (a page where all links on a page are excluded or seen before), either (i) replay each page visited after establishing a new session (repeating #1), and collect code coverage, or (ii) if different code was executed the second time, this page relies on server side state of some sort;

4. Continue the breadth first scanning.

A few variations for this implementation are possible. The depth-first scanning can be replaced with a manual explore—the user explores the application, and the visited pages are analyzed to see if they depend on server-side state. For performance purposes, we can perform less thorough scans, like performing a breadth-first and a depth-first scan and comparing the code coverage of each page with the two.

Using Heuristics on known platforms, different platforms often only provide applications specific places to store session state. Therefore, by looking for pages that modify or query these variables, we can flag those pages as requiring state. However, it's important to understand that login is a "simple" state, as it's a true/false state (logged in or logged out). This allows us to check if we are in state or not, creating a simple tree. Some server-side state scenarios have multiple options, and therefore handling them will require custom logic.

In still another embodiment of the present invention, a computer-implemented system for detecting and monitoring server side state during the scanning of a web application is provided.

Figure 5:
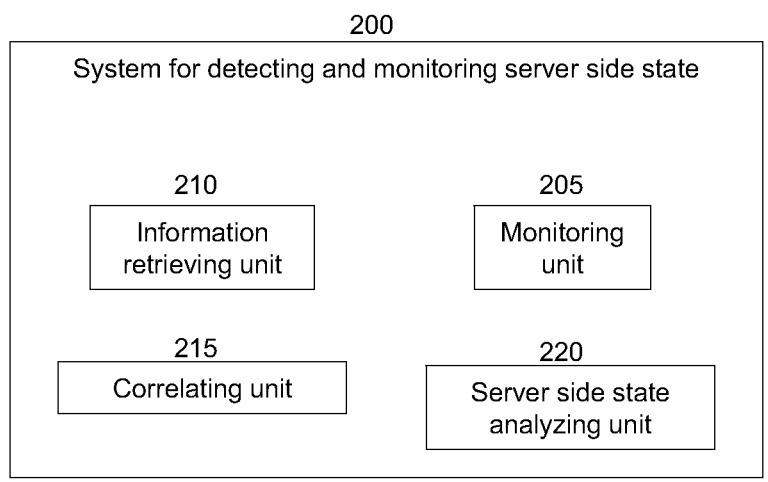
FIG. 5 is a block diagram that illustrates a computer-implemented system for detecting and monitoring server side state during the scanning of a web application according to embodiments of the present invention.

Referring to FIG. 5, a block diagram illustrates a computer-implemented system for detecting and monitoring server side state during the scanning of a web application 200. According to the embodiment of the present invention, the system 200 includes: a monitoring unit 205; an information retrieving unit 210; a correlating unit 215; and a server side state analyzing unit 220.

Figure 6:
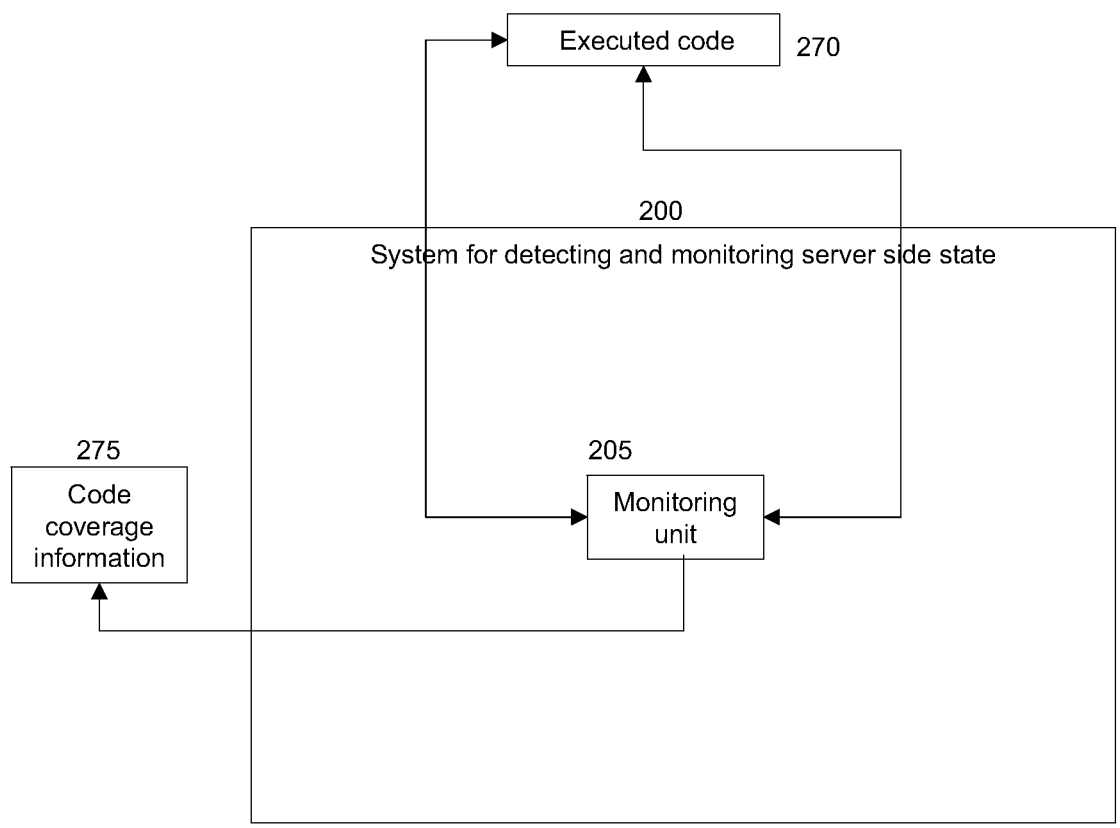
FIG. 6 is a block diagram that illustrates the details of the monitoring unit of the system according to embodiments of the present invention.

FIG. 6 is a block diagram that illustrates the details of the monitoring unit 205 of the system 200. According to the embodiment of the present invention, the monitoring unit 205 monitors executed code 270 of the web application 260 while the web application 260 is scanned to produce code coverage information 275.

Figure 7:
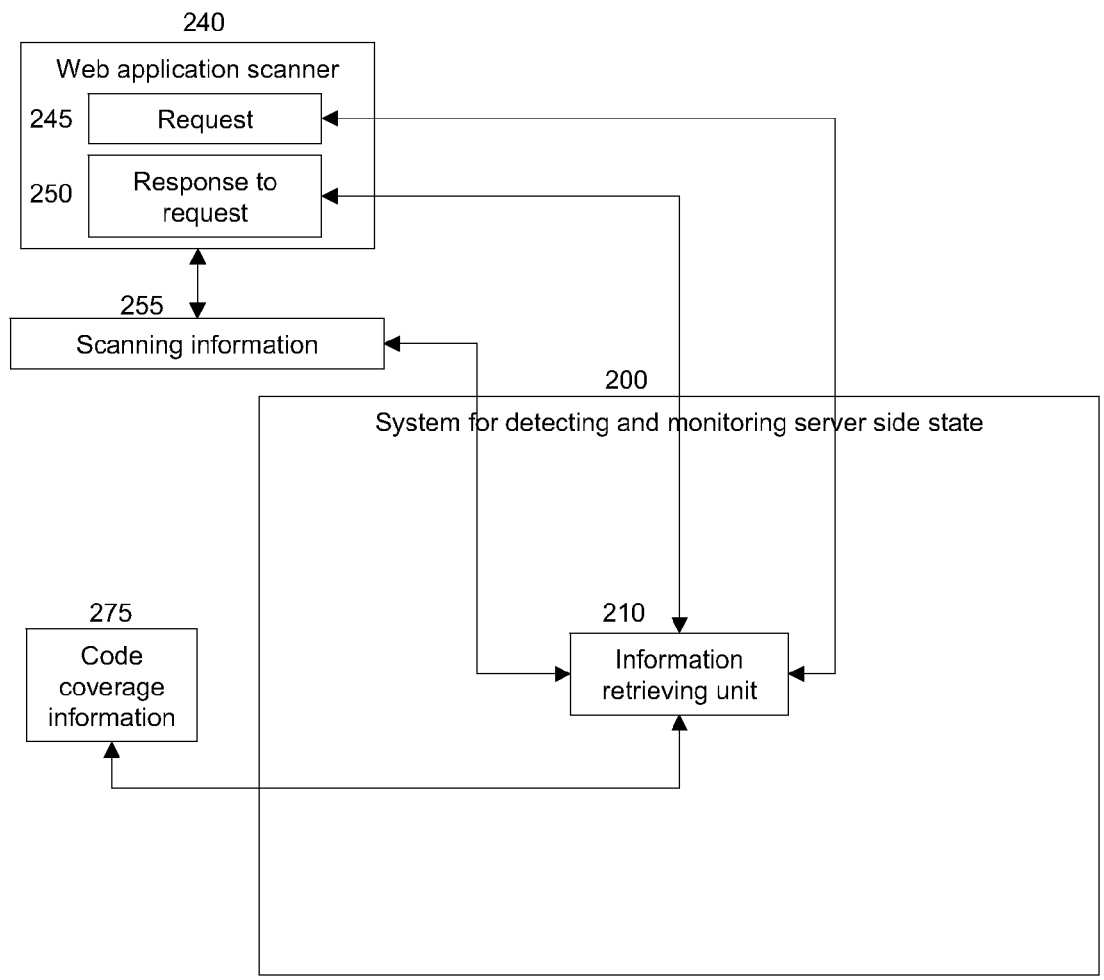
FIG. 7 is a block diagram that illustrates the details of the information retrieving unit of the system according to embodiments of the present invention.

FIG. 7 is a block diagram that illustrates the details of the information retrieving unit 210 of the system 200. According to the embodiment of the present invention, the information retrieving unit 210 retrieves information about a request sent 245 to the web application, information about a response received 250, scanning information 255, and code coverage information 275 from the monitoring unit 205.

Figure 8:
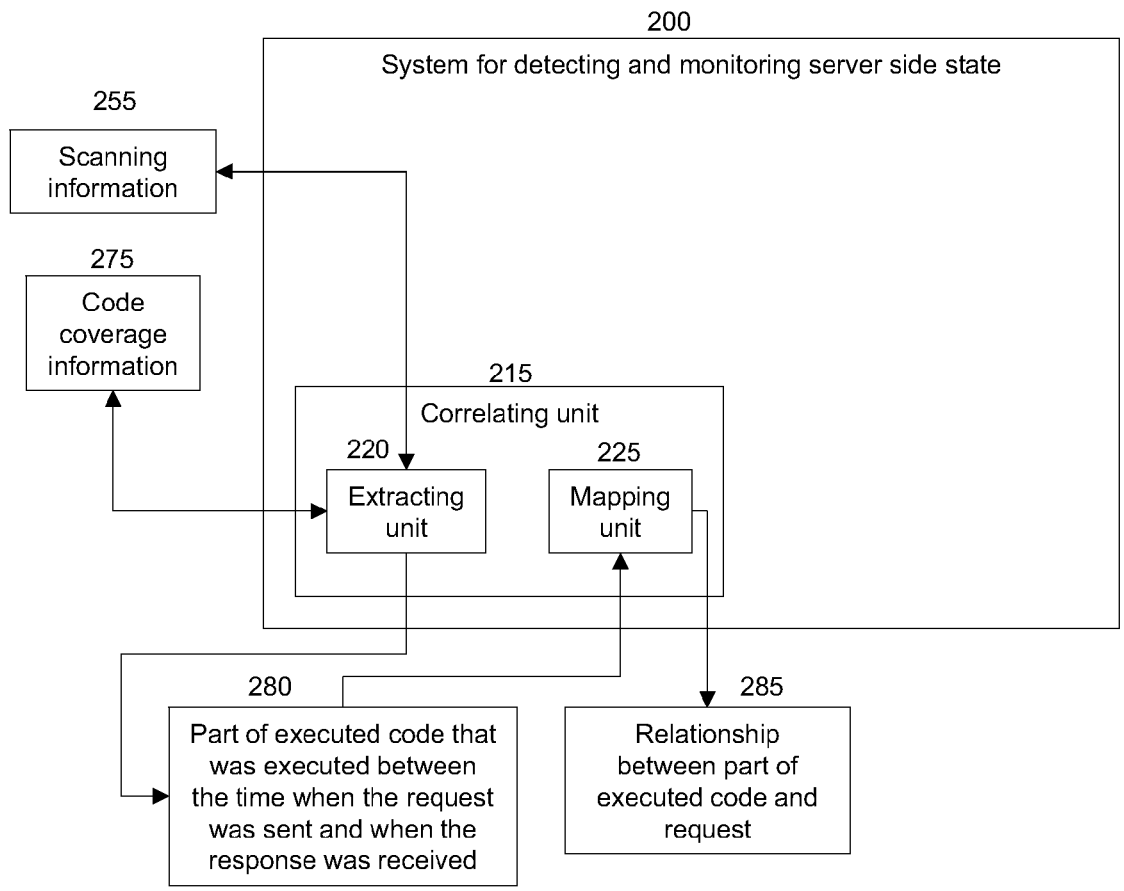
FIG. 8 is a block diagram that illustrates the details of the correlating unit of the system according to embodiments of the present invention.

FIG. 8 is a block diagram that illustrates the details of the correlating unit 215 of the system 200. According to the embodiment of the present invention, the correlating unit 215 correlates the code coverage information 275 with the scanning information 255. The correlating unit 215 includes: an extracting unit 220 and a mapping unit 225. The extracting unit 220 extracts, from the code coverage information 275, the part of the executed code that was executed between the time when the request was sent and when the response was received 280. The mapping unit 225 maps the part of the executed code 280 to the request 245 (in FIG. 7) to establish a relationship between the part of the executed code and the request 285.

Figure 9:
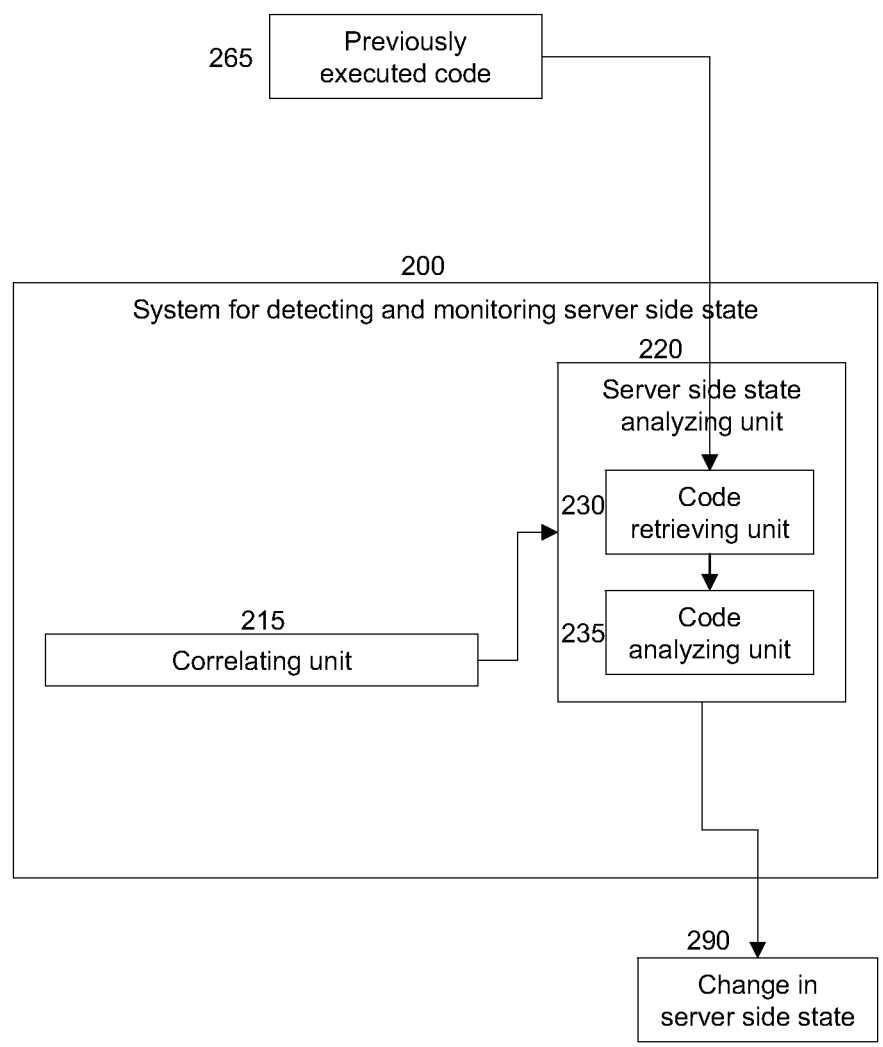
FIG. 9 is a block diagram that illustrates the details of the server side state unit of the system according to embodiments of the present invention.

FIG. 9 is a block diagram that illustrates the details of the server side state analyzing unit 220 of the system 200. According to the embodiment of the present invention, the server side state analyzing unit 220 determines a change in the server side state 290 based on the results of the correlation unit 215. The server side state analyzing unit 220 includes: a code retrieving unit 230 and a code analyzing unit 235. The code retrieving unit 230 retrieves the part of previously executed code 265 on the web application 260 that was executed between the time when a previous request was sent and when a previous response was received. The request 245 is the same as the previous request. The code analyzing unit 235 determines if the part of previously executed code is different from the part of the executed code that was executed between the time when the request was sent and when the response was received.

The system according to the embodiment of the present invention can further include a server side state identifying unit for identifying the server side state based on the determination of the server side state analyzing unit (not shown in the figures.)

The system according to the embodiment of the present invention may include other units or devices or a combination of such other units and the units discussed above in order to execute the steps of the methods.

In still another embodiment of the present invention, computer program products are provided for detecting and monitoring server side state during the scanning of a web application. The computer program products includes computer program instructions stored on a computer readable storage medium, where the instructions, when executed, will cause a computer to perform the steps of the methods.

Figure 10:
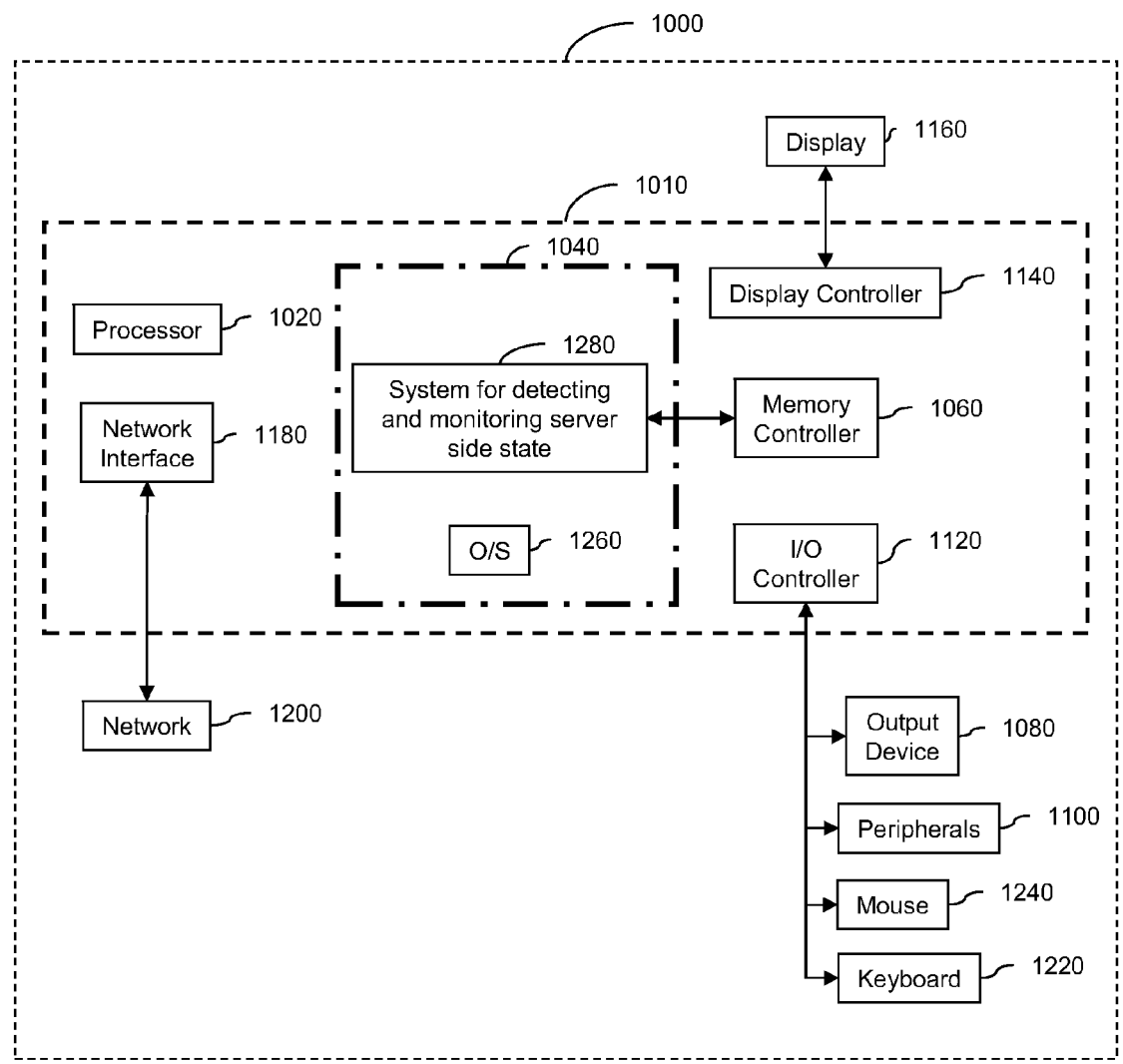
FIG. 10 is a block diagram that illustrates a data processing system in which embodiments of the present invention may be implemented

FIG. 10 is a block diagram that illustrates a data processing system in which embodiments of the present invention may be implemented.

These techniques refer to a session state, not a persistent state.

Referring to FIG. 10, a block diagram illustrates an exemplary computing system 1000 that includes a computer-implemented system for detecting and monitoring server side state during the scanning of a web application 1280. The computing system 1000 includes a computer 1010. As can be appreciated, the computing system 1000 can include any of a variety of known computing devices, including but not limited to, a desktop computer, a laptop, a server, a portable handheld device, or other electronic devices. For ease of this discussion, this embodiment of the invention will be discussed in the context of the computer 1010.

The computer 1010 is shown to include a processor 1020, memory 1040 coupled to a memory controller 1060, one or more input and/or output (I/O) devices 1080, 1100 (or peripherals) that are communicatively coupled via a local input/output controller 1120, and a display controller 1140 coupled to a display 1160. In an exemplary embodiment, the system 1000 can further include a network interface 1140 for coupling to a network 1200. The network 1200 transmits and receives data between the computer 1010 and external systems. In an exemplary embodiment, a conventional keyboard 1220 and mouse 1240 can be coupled to the input/output controller 1120.

The memory 1040 stores instructions that can be executed by the processor 1020. The instructions stored in memory 1040 may include one or more separate programs, each of which includes an ordered listing of executable instructions for implementing logical functions. In the example shown in FIG. 10, the instructions stored in the memory 1040 include a suitable operating system (OS) 1260 to control the execution of other computer programs and provide scheduling, input-output control, file and data management, memory management, and communication control and related services.

The processor 1020 is configured to execute the instructions stored within the memory 1040, to communicate data to and from the memory 1040, and to generally control operations of the computer 1010 pursuant to the instructions. The processor 1020 can be a custom made or generally available processor, a central processing unit (CPU), an auxiliary processor among several processors associated with the computer 1010, a semiconductor based microprocessor (in the form of a microchip or chip set), a macroprocessor, or generally any device for executing instructions.

The processor 1020 executes the instructions of the computer-implemented system for detecting and monitoring server side state during the scanning of a web application 1280 according to an embodiment of the present invention. In various embodiments, the system 1280 is stored in the memory 1040 (as shown), is executed from a portable storage device (e.g., CD-ROM, Diskette, Flash Drive, etc.) (not shown), and/or is run from a remote location such as from a central server (not shown).

According to still another embodiment of the present invention, a computer program product is provided for detecting and monitoring server side state during the scanning of a web application. The computer program product includes computer program instructions stored on a computer readable storage medium. When the instructions are executed, a computer will perform the steps of the method 200.

As will be appreciated by those skilled in the art, aspects of the present invention may be embodied as a system or method (as described above) or as a computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in one programming language or in a combination of two or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method of detecting and monitoring server side state during scanning of a web application, the method comprising:

monitoring, via one or more computing devices, executed code of said web application while scanning said web application, wherein scanning includes invoking specific actions in relation to the web application;

retrieving, via the one or more computing devices, code coverage information from said monitoring of said executed code and retrieving scanning information from said scanning of said web application;

correlating, via the one or more computing devices, said code coverage information with said scanning information; and determining, via the one or more computing devices, a change in said server side state based on said correlation, wherein said determining comprises:

retrieving the part of previously executed code on said web application that was executed between a time when a previous request was sent and when a previous response was received, wherein said request is the same as said previous request; and determining if said part of previously executed code is different from said part of said executed code that was executed between the time when said request was sent and when said response was received.

2. The method according to claim 1, wherein said step of monitoring executed code of said web application while scanning said web application comprises:
sending a request to said web application; and
receiving a response to said request.

3. The method according to claim 2, wherein said step of correlating said code coverage information with said scanning information comprises:
extracting, from said code coverage information, part of said executed code that was executed between a time when said request was sent and when said response was received; and
mapping said part of said executed code to said request to establish a relationship between said part of said executed code and said request.

4. The method according to claim 1, further comprising identifying said server side state based on said step of determining a change in said server side state.

5. A computer-implemented method of detecting and monitoring server side state during scanning of a web application, the method comprising:
monitoring, via one or more computing devices, executed code of said web application while scanning said web application, wherein scanning includes invoking specific actions in relation to the web application;
retrieving, via the one or more computing devices, code coverage information from said monitoring of said executed code and retrieving scanning information from said scanning of said web application; and
determining, via the one or more computing devices, based on said code coverage information and said scanning information, if a specified portion of the web application code was executed, wherein said determining comprises:
retrieving the part of previously executed code on said web application that was executed between a time when a previous request was sent and when a previous response was received, wherein said request is the same as said previous request; and
determining if said part of previously executed code is different from said part of said executed code that was executed between the time when said request was sent and when said response was received.

6. The method according to claim 5, wherein said step of monitoring executed code of said web application while scanning said web application comprises:
sending a request to said web application; and
receiving a response to said request.

7. A computer-implemented method of detecting and monitoring server side state during scanning of a web application, the method comprising:
sending, via one or more computing devices, a request to said web application while monitoring executed code of said web application and scanning said web application, wherein scanning includes invoking specific actions in relation to the web application;
receiving, via the one or more computing devices, a response to said request;
retrieving, via the one or more computing devices, code coverage information from said monitoring of said executed code and retrieving scanning information from said scanning of said web application
extracting, via the one or more computing devices, from said code coverage information, part of said executed code that was executed between a time when said request was sent and when said response was received;
mapping, via the one or more computing devices, said part of said executed code to said request to establish a relationship between said part of said executed code and said request;
retrieving, via the one or more computing devices, the part of previously executed code on said web application that was executed between a time when a previous request was sent and when a previous response was received, wherein said request is the same as said previous request; and
determining, via the one or more computing devices, if said part of previously executed code is different from said part of said executed code that was executed between the time when said request was sent and when said response was received.

8. The method according to claim 7, further comprising identifying said server side state based on said step of determining a change in said server side state.

9. A computing system comprising:
a monitoring unit, executed by a processor of a computing device, for monitoring executed code of said web application while scanning said web application, wherein scanning includes invoking specific actions in relation to the web application;
an information retrieving unit, executed by the processor of the computing device, for retrieving code coverage information from said monitoring of said executed code and for retrieving scanning information from said scanning of said web application;
a correlating unit, executed by the processor of the computing device, for correlating said code coverage information with said scanning information; and
a server side state analyzing unit, executed by the processor of the computing device, for determining a change in said server side state based on said correlation, wherein said server side state analyzing unit comprises:
a code retrieving unit, executed by the processor of the computing device, for retrieving part of previously executed code on said web application that was executed between a time when a previous request was sent and when a previous response was received, wherein said request is the same as said previous request; and
a code analyzing unit, executed by the processor of the computing device, for determining if part of previously executed code is different from said part of said executed code that was executed between the time when said request was sent and when said response was received.

10. The computing system of claim 9, wherein said information retrieving unit further retrieves information about a request sent to said web application and information about a response to said request.

11. The computing system of claim 10, wherein said correlating unit comprising:
an extracting unit, executed by the processor of the computing device, for extracting, from said code coverage information, part of said executed code that was executed between a time when said request was sent and when said response was received; and
a mapping unit, executed by the processor of the computing device, for mapping part of said executed code to said request to establish a relationship between said part of said executed code and said request.

12. The system according to claim 9, further comprising a server side state identifying unit, executed by the processor of the computing device, for identifying said server side state based on the determination of said server side state analyzing unit.

13. A computer-implemented system for detecting and monitoring server side state during the scanning of a web application, said system comprising one or more devices that:
monitor, via one or more computing devices, executed code of said web application while scanning said web application, wherein scanning includes invoking specific actions in relation to the web application;
retrieve, via the one or more computing devices, code coverage information from said monitoring of said executed code and retrieve scanning information from said scanning of said web application; and
determine, via the one or more computing devices, based on said code coverage information and said scanning information, if a specified portion of the web application code was executed, by, at least in part:
retrieving the part of previously executed code on said web application that was executed between a time when a previous request was sent and when a previous response was received, wherein said request is the same as said previous request; and
determining if said part of previously executed code is different from said part of said executed code that was executed between the time when said request was sent and when said response was received.

14. A computer-implemented system for detecting and monitoring server side state during the scanning of a web application, said system comprising one or more devices that:
sends, via one or more computing devices, a request to said web application while monitoring executed code of said web application and scanning said web application, wherein scanning includes invoking specific actions in relation to the web application;
receives, via the one or more computing devices, a response to said request;
retrieves, via the one or more computing devices, code coverage information from said monitoring of said executed code and retrieving scanning information from said scanning of said web application;
extracts, via the one or more computing devices, from said code coverage information, part of said executed code that was executed between a time when said request was sent and when said response was received;
maps, via the one or more computing devices, said part of said executed code to said request to establish a relationship between said part of said executed code and said request;
retrieves, via the one or more computing devices, the part of previously executed code on said web application that was executed between a time when a previous request was sent and when a previous response was received, wherein said request is the same as said previous request; and
determines, via the one or more computing devices, if said part of previously executed code is different from said part of said executed code that was executed between the time when said request was sent and when said response was received.

15. A non-transitory computer readable article of manufacture tangibly embodying computer readable instructions which when executed by a processor causes a computer to:
monitor executed code of said web application while scanning said web application, wherein scanning includes invoking specific actions in relation to the web application;
retrieve code coverage information from said monitoring of said executed code and retrieving scanning information from said scanning of said web application;
correlate said code coverage information with said scanning information; and
determine a change in said server side state based on said correlation, by, at least in part:
retrieving the part of previously executed code on said web application that was executed between a time when a previous request was sent and when a previous response was received, wherein said request is the same as said previous request; and
determining if said part of previously executed code is different from said part of said executed code that was executed between the time when said request was sent and when said response was received.

16. A non-transitory computer readable article of manufacture tangibly embodying computer readable instructions which when executed by a processor causes a computer to:
monitor executed code of said web application while scanning said web application, wherein scanning includes invoking specific actions in relation to the web application;
retrieve code coverage information from said monitoring of said executed code and retrieve scanning information from said scanning of said web application; and
determine, based on said code coverage information and said scanning information, if a specified portion of the web application code was executed, by, at least in part:
retrieving the part of previously executed code on said web application that was executed between a time when a previous request was sent and when a previous response was received, wherein said request is the same as said previous request; and
determining if said part of previously executed code is different from said part of said executed code that was executed between the time when said request was sent and when said response was received.

17. A non-transitory computer readable article of manufacture tangibly embodying computer readable instructions which when executed by a processor causes a computer to:
sends a request to said web application while monitoring executed code of said web application and scanning said web application, wherein scanning includes invoking specific actions in relation to the web application;
receives a response to said request;
retrieves code coverage information from said monitoring of said executed code and retrieving scanning information from said scanning of said web application;
extracts, from said code coverage information, part of said executed code that was executed between a time when said request was sent and when said response was received;
maps said part of said executed code to said request to establish a relationship between said part of said executed code and said request;
retrieves the part of previously executed code on said web application that was executed between a time when a previous request was sent and when a previous response was received, wherein said request is the same as said previous request; and
determines if said part of previously executed code is different from said part of said executed code that was executed between the time when said request was sent and when said response was received.

18. The computer-implemented method of claim 1, wherein determining a change in said server side state includes determining if a session of said web application associated with said server side state is valid.

19. The computer-implemented method of claim 1, wherein determining a change in said server side state includes determining if a session of said web application associated with said server side state is logged in.

\* \* \* \* \*